United States Patent [19]

Chamming's et al.

[11] Patent Number: 4,916,282
[45] Date of Patent: Apr. 10, 1990

[54] DEVICE FOR CUTTING THE WALL OF THE TUBULAR PIECE BY ELECTRICAL DISCHARGE MACHINING

[75] Inventors: Pierre Chamming's, Caluire; Jean P. Cartry, Lyons, both of France

[73] Assignee: Framatome, Courbevcie, France

[21] Appl. No.: 274,221

[22] Filed: Nov. 21, 1988

[30] Foreign Application Priority Data

Nov. 20, 1987 [FR] France ................... 87 16123

[51] Int. Cl.$^4$ ................... B23H 1/00; B23H 7/26
[52] U.S. Cl. ................... 219/69.2; 219/69.15; 376/260
[58] Field of Search .......... 219/69.16, 69.15, 69.11, 219/69.2; 376/260; 29/402.09, 402.11, 402.12, 402.13, 402.14, 402.15, 402.16, 402.17, 402.18, 402.19

[56] References Cited

U.S. PATENT DOCUMENTS

| | | | |
|---|---|---|---|
| 3,497,663 | 2/1970 | Turner | 219/69.15 |
| 4,259,562 | 3/1981 | Cammann et al. | 219/69.2 |
| 4,349,716 | 9/1982 | Di Piazza | 219/69.15 |
| 4,476,368 | 10/1984 | Cammann et al. | 219/69.2 |
| 4,584,452 | 4/1986 | Zafred | 219/69.2 |
| 4,639,994 | 2/1987 | Cooper, Jr. et al. | 376/260 |
| 4,682,725 | 7/1987 | Martin et al. | 29/402.16 |

FOREIGN PATENT DOCUMENTS

| | | |
|---|---|---|
| 2593421 | 7/1987 | France . |
| 2084542 | 4/1982 | United Kingdom . |
| 2174106 | 10/1986 | United Kingdom ........ 219/69.2 |

OTHER PUBLICATIONS

Patent Abstracts of Japan, vol. 10, No. 346, published 11/1986, JP-A-61-146,425.

Primary Examiner—Philip H. Leung
Assistant Examiner—Geoffrey S. Evans
Attorney, Agent, or Firm—Pollock, Vande Sande & Priddy

[57] ABSTRACT

The device comprises a support (11) equipped with a fastening element, an assembly (12) mounted movably relative to the support (11) in the direction of the axis (8) of the tubular piece, a pole (13) mounted in the assembly (12) in the direction of the axis (8), an electrode holder (14) in several parts, and an actuating rod mounted movably in the pole (13) in the direction of the axis (8), in order to ensure the spacing of the various parts of the electrode-holder (14) and the radial movement of the electrodes. A vibrator (16) enables vibration of the pole (13) and the electrode-holder (14) in the direction of the axis (8). In a first phase, the wall of the tubular piece is pierced as a result of the radial movement of the electrodes, and in a second phase, cutting is carried out as a result of the axial movement of the movable assembly (12) carrying the pole (13).

13 Claims, 9 Drawing Sheets

FIG_1A

FIG_1B

FIG_1

FIG_5

FIG_9

FIG_8

DEVICE FOR CUTTING THE WALL OF THE TUBULAR PIECE BY ELECTRICAL DISCHARGE MACHINING

FIELD OF THE INVENTION

The invention relates to a device for cutting by electrical discharge machining the wall of a tubular piece crimped inside a cylindrical receptacle.

BACKGROUND OF THE INVENTION

The steam generators of pressurized-water nuclear reactors comprise a bundle of tubes bent in the form of a U, which tubes are crimped in a tube plate of great thickness at each of their ends. These tubes ensure the separation between the pressurized water forming the primary fluid and the feed water forming the secondary fluid and which is heated and vaporized in the steam generator. The pressurized primary water circulates inside the tubes, and the feed water is brought in contact with the outer surface of the tubes in part of the steam generator.

When the steam generator has been in service for a long period of time, some of the tubes of the bundle are liable to be damaged under the effect of corrosion caused by the primary fluid or the secondary fluid and show cracks in their wall. It is then necessary to put the corresponding tube out of action or repair it, in order to prevent primary fluid from being introduced into the part of the steam generator receiving the feed water.

It is known to repair the tubes of steam generators having cracked zones causing leaks by the use of a liner which is introduced into the tube in its cracked zone and which is crimped inside the tube on either side of the cracked zone.

It may be expedient to remove these liners after a certain period of service in the steam generator, for example in order to check or study the stability of the liner under the operating conditions of the steam generator.

The repair liners for the steam-generator tubes are fastened as a result of diametral expansion inside the tubes, the liner and the tube usually both experiencing plastic deformation.

The crimping of the liner in the tube is generally carried out, on the one hand, in a zone of the tube located in the tube plate and, on the other hand, in a zone located outside the tube plate. Crimping outside the tube plate causes diametral expansion of the tube, with the result that it is no longer possible to pass this crimped zone through the tube passage hole in the tube plate during dismantling for the purpose of an expert appraisal.

It is therefore possible to extract a liner only after the tube and the liner have been given a certain possibility of diametral contraction in this crimped zone outside the tube plate.

Various processes have been proposed for carrying out this contraction of the tube, for example rapid heating of the tube followed by cooling, during which the stresses exerted cause diametral contraction of the tube. However, for tubes of a diameter substantially equal to or less than 20 mm, the contraction obtainable is very low and most of the time insufficient to allow extraction under good conditions.

There has therefore been a proposal for an extraction method involving making longitudinal slits in the wall of the tube and/or of the liner in their crimped zone by cutting, and then exerting a pull on the tube and the liner which it becomes possible to pass through the holes in the tube plate as a result of diametral contraction of the zones located between the longitudinal cuts.

The cutting operation can be carried out by electrical discharge machining. For example, a technique generally known as and called electric "sawing arc" is known.

In this process, a tool comprising a rotary disc forming an electrode supplied with electrical current is introduced into the liner or the crimped tube to be removed. The rotation and radial advance of the disc make it possible to cut the wall of the liner and of the tube over its entire thickness, the tool subsequently being moved over an axial length corresponding to the length desired for the longitudinal slits. The operation is repeated a number of times, and, after a certain rotation of the tool about the axis of the tube, this is sufficient to obtain the desired number of longitudinal slits located at a distance from one another along the periphery of the tube and/or of the liner.

During the entire operation, water is circulated inside the tube and makes it possible to cool and eliminate the particles ejected by the disc during cutting.

It is clear that such a device comprising a rotating disc, means of advance, supply means and, if appropriate, guide means which have to be introduced into the tube presents difficulties in design terms, where tubes of an inside diameter less than 20 mm are concerned.

On the other hand, making several slits presupposes successive operations between which the tool must to reorientated.

SUMMARY OF THE INVENTION

The object of the invention is, therefore, to provide a device for cutting by electrical discharge machining the wall of a tubular piece crimped inside a cylindrical receptacle in a fixed installation, in order to make, from the inside of the tubular piece, at least two cuts directed axially relative to the cylindrical receptacle and to the tubular piece, comprising, in a known way, at least one electrode, means for supplying this electrode with electrical current, and means for circulating water in the tubular piece, this device, which has a simple structure and which is simple to put into practice, making it possible to carry out several axially directed cuts simultaneously.

To achieve this object, the device according to the invention also includes:

a support equipped with means for fastening to the installation near one end of the cylindrical receptacle and with means for guidance in a direction corresponding to the axial direction of the cylindrical receptacle when the fastening of the support is carried out, an assembly mounted movably relative to the support in the axial direction as a result of the guide means and comprising drive means for movement in the axial direction, a tubular pole mounted on the assembly movable in the axial direction and having a longitudinal part, the diameter of which is less than the inside diameter of the tubular piece, an electrode-holder fastened to a free end of the longitudinal part of the pole and taking the form of a tubular piece, of which part of the bore is of frusto-conical shape, separated into at least two segments, each carrying an electrode, by means of axial cuts, an actuating rod mounted so as to be axially movable in the tubular pole and associated with means for axial movement and of which the end penetrating into the frusto-conical bore has a diameter greater than the diameter of the bore and allows the radial movement of the electrodes, and a device for causing axial vibration, having a part movable in the axial direction and fixed to the tubular pole and a fixed part mounted on the movable assembly.

BRIEF DESCRIPTION OF THE DRAWINGS

To make it easier to understand the invention, an embodiment of a device according to the invention, making it possible to cut a repair liner of a steam-generator tube and the tube itself, before then are extracted, via the inlet face of the tube plate of the steam generator, will now be described by way of example with reference to the accompanying drawings.

DESCRIPTION OF THE PREFERRED EMBODIMENT

Figure 1:
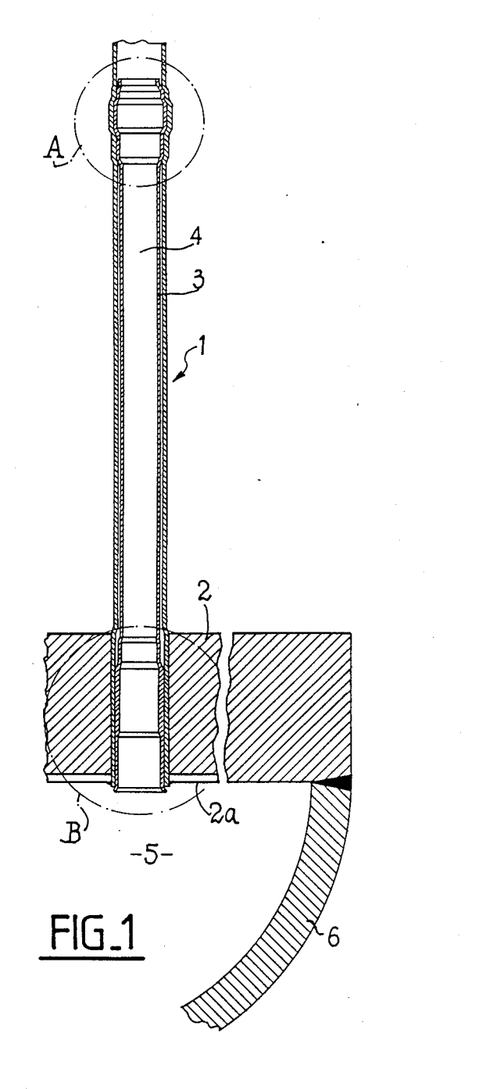
FIG. 1 is a sectional view of part of a steam-generator tube, in which a repair liner is fitted.

FIG. 1 illustrates an end part of a steam-generator tube 1 engaged and crimped in a hole passing through the tube plate 2 of the steam generator. The plate 2 has a network of holes, each receiving one end of a tube 1 of the bundle.

Figure 1A:
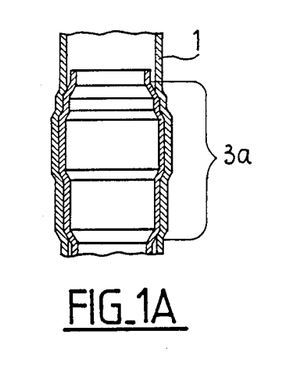
FIG. 1A is an enlarged view of the detail A of FIG. 1.
Figure 1B:
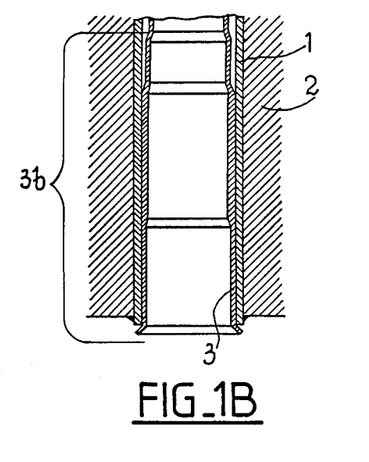
FIG. 1B is an enlarged view of the detail B of FIG. 1.

The tube 1 has, in its shown end part, a repair liner 3 which is crimped inside the tube 1, on the one hand in the zone A shown in FIG. 1A and located outside the tube plate 2, and on the other hand in the zone B shown in FIG. 1B and located inside the tube plate 2.

The liner 3 is intended for carrying out the repair of a tube which has a leak-generating crack between the zones A and B.

FIG. 1A shows the zone 3a of the liner 3 crimped inside the tube 1 on the outside of the tube plate. This crimping is obtained by means of an expander which causes diametral expansion of the liner 3 and of the tube 1 according to the profile shown. This diametral expansion is accompanied by plastic deformation of the liner and of the tube.

FIG. 1B shows the zone 3b of the liner 3 crimped in the tube 1 inside the tube plate 2. This crimping, which can be carried out by expansion, results in a rolling of the wall of the liner 3 on the inner wall of the tube 1. The tube 1 is itself crimped in the tube plate 2 as a result of the rolling of its wall against the wall of the hole passing through the tube plate 2. The crimping of the tube 1 and of the liner in the zone B does not cause any diametral expansion of the tube, in contrast to what occurs in the zone A. The liner 3 only experiences slight diametral expansion inside the tube 1.

When the liner 3 is to be removed, for example for the purpose of an expert appraisal, it is necessary to cut the tube above the zone A and then break the connections between the tube 1 and the tube plate 2. The tube 1 is usually fastened in the tube plate by means of crimping and welding, and because of this it is necessary to break the welded connection by machining and to decrimp the tube.

The decrimping of the tube can be achieved by rapid heating followed by cooling, the stresses generated in the tube plate causing diametral contraction of the tube, allowing it to be removed.

However, the zone A of the tube and liner has an outside diameter substantially larger than the diameter of the hole passing through the tube plate 2. It is therefore necessary to subject this zone A to diametral contraction to ensure that it passes through the tube plate.

If several longitudinal slits parallel to the axis 4 of the tube and passing through the wall of the liner 3 and of the tube 1 are made over the entire length of the zone A and, if appropriate, over a short length on either side of this zone, the tube and the liner can be diametrally contracted.

The device according to the invention, which will be described with reference to FIGS. 2 to 9, makes it possible for three axially directed slits passing through the wall of the liner 3 and the tube 1 to be made in a single operation from the inside of the liner 3.

Figure 2:
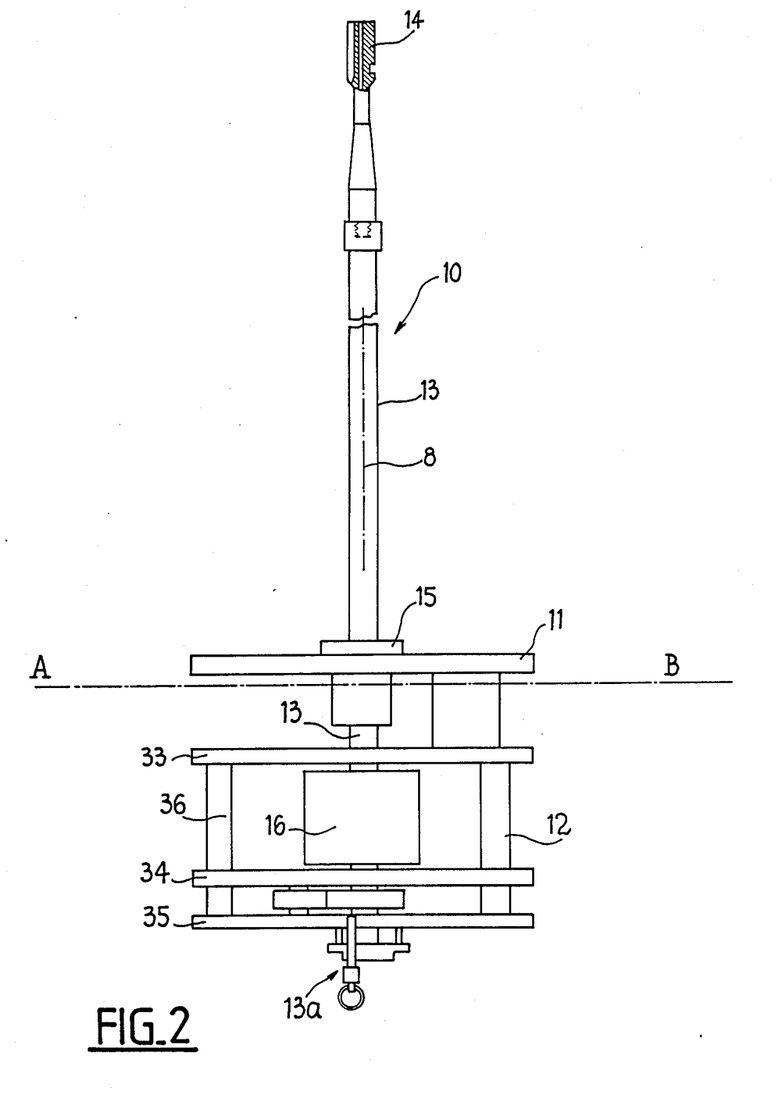
FIG. 2 is an elevation view of the cutting device according to the invention as a whole.

The tool used, shown in FIG. 2, must be introduced and put in position inside a part of the steam generator located underneath the inlet face 2a of the tube plate and forming a water box 5 delimited by a hemispherical bottom 6 having access orifices. The tool can be put in position either by an operator entering the water box 5 for a very short time or in a completely automatic way controlled from outside the water box.

FIG. 2 shows the device 10 according to the invention highly diagrammatically in its protective housing. This device comprises a support plate 11 making it possible to fasten the device under the tube plate 2 inside the water box 5, an assembly 12 movable relative to the support plate 11 in the direction of the axis 8 of the device, a tubular pole 13 mounted removably on the movable assembly 12 in the direction of the axis 8, and an electrode-holder 14 fastened to the end of the pole 13 opposite its end part engaged in the movable assembly 12. The device also includes a guide sleeve 15 for the pole 13, fixed to the support plate 11, and a vibrator 16 fixed to the movable assembly 12 and having a part movable in the direction of the axis 8 and fixed to the end of the tubular pole 13. The pole 13 is mounted removably in the movable assembly 12 and has an end 13a which is opposite the electrode-holder 14 and which is accessible from the lower part of the tool.

Reference will now be made to FIGS. 3A, 3B and 4 to 9 to describe in detail the device according to the invention and the way in which it is used for cutting a repair liner and a steam-generator tube.

Figure 3A:
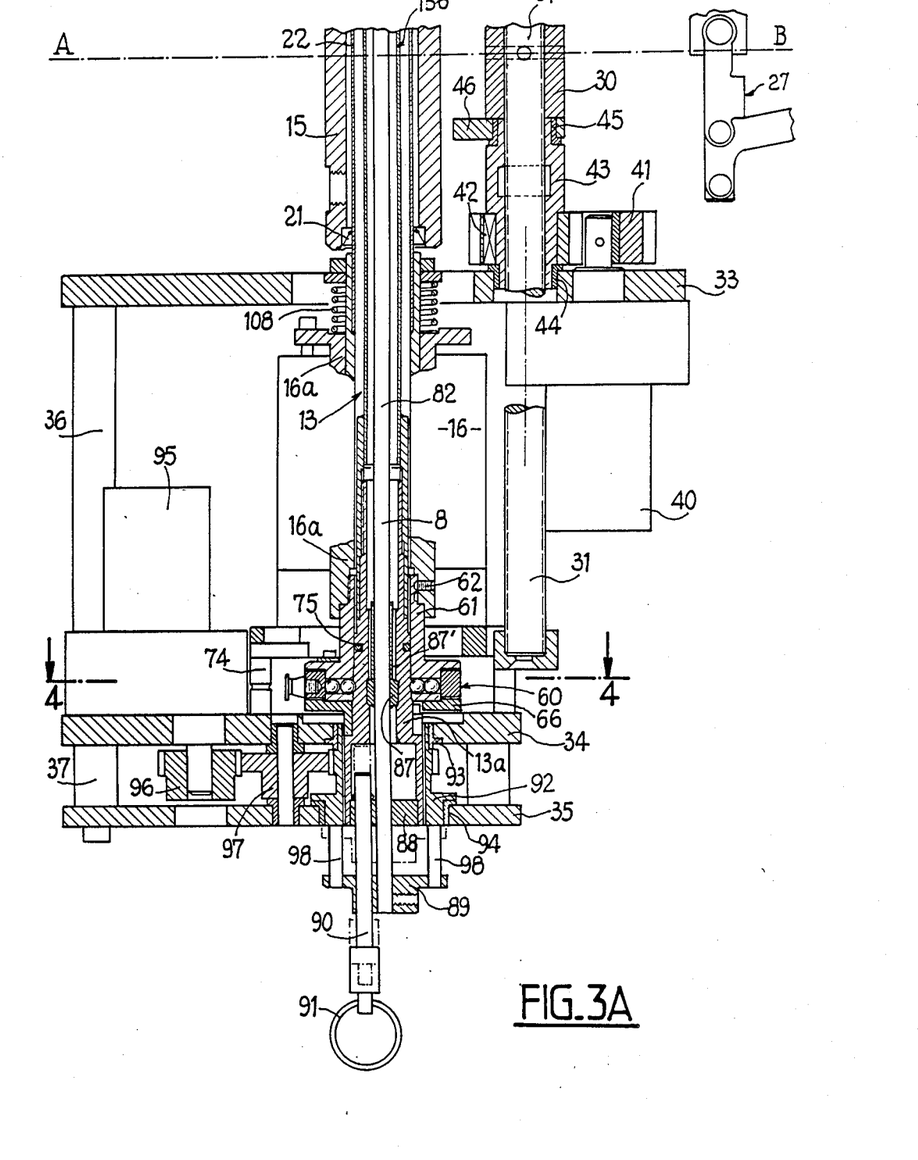
FIG. 3A is a sectional view, taken in a vertical plane, of the lower part of the device illustrated in FIG. 2.
Figure 3B:
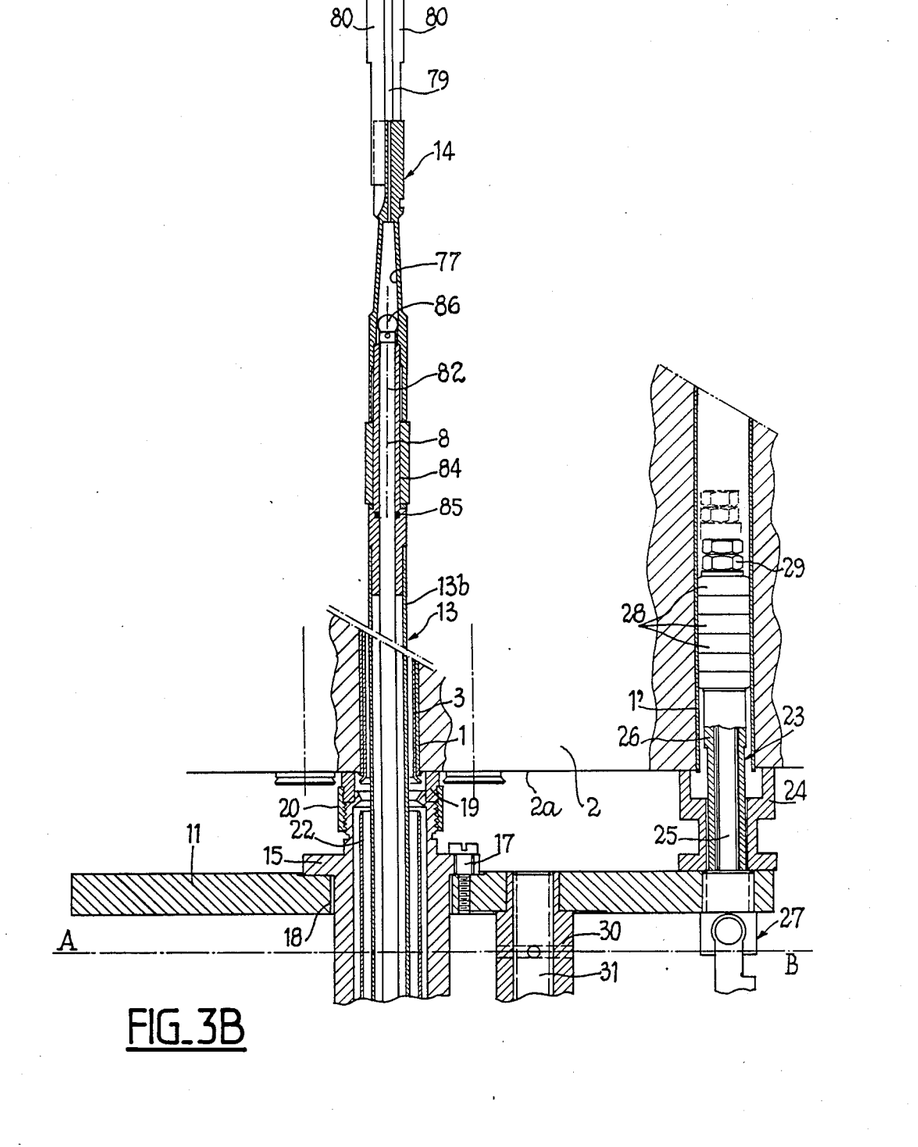
FIG. 3B is a sectional view, taken in a vertical plane, of the upper part of the device shown in FIG. 2.

FIGS. 3A and 3B show respectively the lower part and the upper part of the device installed under the tube plate 2 in order to carry out the cutting of a liner 3 and of a tube 1 from the inside.

FIGS. 3A and 3B are joined along the dot-and-dash line AB which marks on the drawing plane a horizontal plane located at an intermediate level between the level of the support plate 11 and the level of the upper part of the movable assembly 12.

The support plate 11 (FIG. 3B) has a passage orifice 18, at which the sleeve 15 making it possible to guide and position the pole 13 is fastened by means of screws 17. A sealing ring 19 is fastened to the upper end of the sleeve 15 by means of a knurled nut 20. When the device is installed under the tube plate 2, the seal 19 abuts up the inlet face 2a of the tube plate and ensures that the support 11, 15 of the tool is brought into sealing contact with the inlet face of the tube plate.

Arranged inside the sleeve 15 is a lip gasket 21 allowing an outer jacket 22 fixed to the pole 13 to be mounted sealingly and slidably inside the sleeve 15.

The support plate 11 also carries three identical fastening devices 23 arranged so as to engage into tubes 1' of the bundle which pass through the tube plate in positions near the tube 1 in which cutting is carried out. The devices 23 make it possible to fasten the support plate 11 under and parallel to the inlet face 2a of the tube plate.

Each of the devices 23 comprises a strut 24, a threaded rod 25, a spacer column 26 and a toggle-type actuation means 27 comprising a handle for locking and releasing the fastening device.

Six rubber fastening rings 28 are slipped onto the rod 25 and inserted between nuts 29 fastened to the end of the rod 25 and the upper part of the spacer column 26.

The toggle-type actuation device 27 makes it possible to move the rod 25 in its axial direction 29 relative to the strut 24 up against the face 2a of the tube plate and relative to the spacer column 26. The downward movement of the rod 25 makes it possible, as a result of an axial force, to bring about the radial expansion of the rubber rings 28 inserted between the nuts 29 and the spacer column 26.

Thus, as a result of the actuation of the three devices 23, the rings 28 are locked in the tubes 1' and the tool is fastened under the tube plate.

The support plate 11 also carries, by means of a bearing 30, a screw 31 mounted vertically under the plate 11.

The movable assembly 12 consists of three parallel plates 33, 34 and 35 joined to one another and held at a certain spacing by long columns 36 arranged between the plates 33 and 34 and by short columns 37 arranged in the extension of the columns 36 between the plates 34 and 35.

Figure 6:
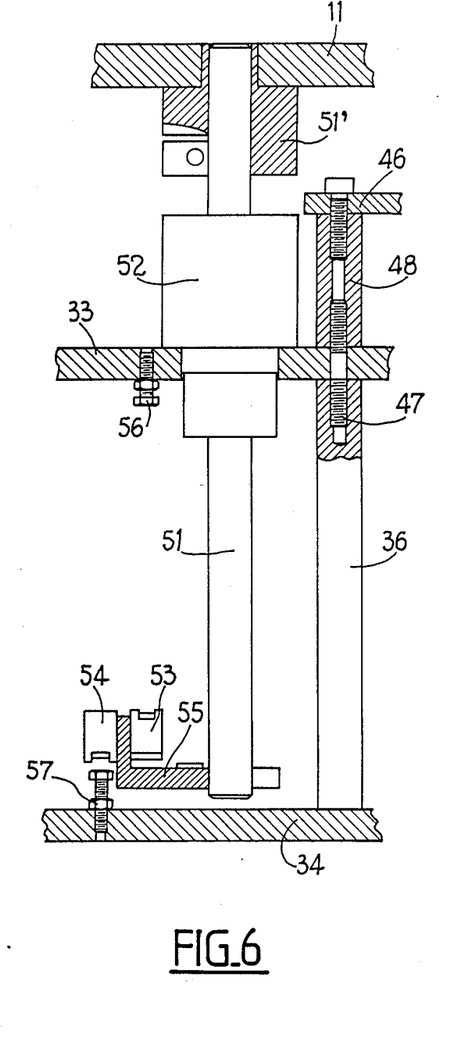
FIG. 6 is a sectional view along line 6—6 of FIG. 4.

The upper plate 33 of the movable assembly 12 carries a drive motor 40, the output shaft of which is fixed to a pinion 41 meshing with a pinion 42, itself fixed in terms of rotation to a nut 43 engaged on the screw 31. The nut 43 is mounted rotatably on the movable assembly 12 by means of a first smooth bearing 44 fastened in a hole passing through the plate 33 and by means of a second smooth bearing 45 mounted in a support 46, itself fixed to the movable assembly 12. As can be seen in FIG. 6, the support 46 is fastened, by means of screws 47 and struts 48 arranged in the extension of two of the four columns 36, in a position parallel to and above the plate 33 of the movable assembly.

FIG. 6 also shows that the support plate 11 carries, by means of a fastening bearing 51', a guide column 51 perpendicular to the plate 11 and therefore directed vertically.

Figure 4:
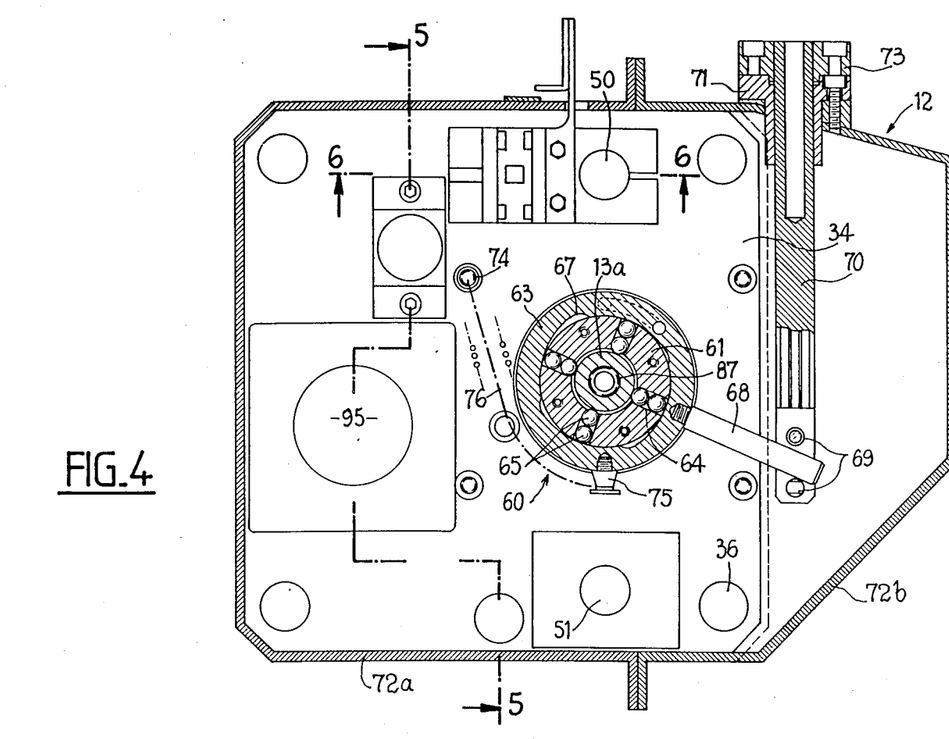
FIG. 4 is a sectional view along line 4—4 of FIG. 3A.

Referred to FIG. 4, it can be seen that a second vertical guide column 50 is likewise associated with the movable assembly 12 for guiding it during its vertical movements. The columns 50 and 51 are arranged on either side of the part of the movable assembly receiving the tubular pole 13.

As can be seen from FIG. 6, a ball bush 52 fixed to the upper plate 33 of the movable assembly is mounted slidably on the column 51. A second ball bush is likewise mounted on the plate 33 in a position corresponding to the guide column 50.

Two electrical contactors 53 and 54 are fastened to a support 55, itself fixed to the lower part of the column 51. Two adjustable screws 56 and 57 are fastened to the plates 33 and 34 of the movable assembly 12 respectively. The adjustable screws 56 and 57 form two stops located in such positions that the contactor 53 and the contactor 54 respectively come in contact with the screws 56 and 57, when the movable assembly 12 is at the end of its travel in its upward movement or in its downward movement. These movements of the movable assembly 12 are obtained by means of the motor 40 which drives in rotation the nut 43 moving on the screw 31. The supply to the motor 40 is cut off automatically when the contactor 53 or the contactor 54 are actuated by the corresponding stops.

As can be seen in FIGS. 3A and 4, the tubular pole 13 is fastened removably to the movable assembly 12 by means of the vibrator 16. The fixed part of the vibrator 16 is fastened to the plate 34 of the movable assembly, and the vibrating movable part 16A of this vibrator 16 is connected to a pole support 61, to which the base 13a of the pole can be connected by means of a ball-type locking device 60 making it possible to fasten the pole 13 removably to the support 61.

The upper part of the support 61 is threaded and is screwed into an internally threaded hole in the vibrating part 16a of the vibrator 16. A stud 62 makes it possible to lock the pole support 61 on the element 16a of the vibrator.

The tubular pole support 61 has passing through it over its entire thickness radial orifices 64, in each of which are arranged two locking balls 65. An outer ring 63 is mounted so as to be movable in rotation about the pole support 61, level with the radial orifices 64. The ring 63 is held in place by a retention piece 66.

The outer ring 63 has, on its inner surface, four receptacles 67 arranged at 90° relative to one another in terms of a rotation of the ring 63 about its axis coinciding with the axis of the tubular pole 13.

The four radial orifices 64 are likewise arranged on the pole support 61 at 90° relative to one another.

The outer ring 63 is fixed to an actuating arm 68, of which the end opposite the ring 63 is engaged between two pegs 69 fastened to the end of a splined shaft 70 engaged in a socket 71 having splines corresponding to those of the shaft 70. The socket 71 is fixed to a halfhousing 72a ensuring that the assembly 12 is closed on its outer surface in association with a second halfhousing 72b.

The end of the shaft 70 is connected, on the outside of the socket 71, to an annular piece 73 forming a stop for the shaft 70 and an actuating means for locking and unlocking the tubular pole. The outer ring 63 of the locking and unlocking assembly 60 likewise carries a peg 75 connected by means of a restoring spring 76 to a fastening lug 74 secured to the plate 34 of the movable assembly.

The base 13a of the tubular pole 13 has an axial-locking groove in its part coming opposite the orifices 64 and the balls 65.

As can be seen in FIG. 4, the pole 13 is locked in the pole support 61 by orienting the ring 63 in such a way that the solid parts of the inner surface of this ring which are located between the receptacles 67 face the orifices 64 and the balls 65. The balls are then pushed back into the axial-locking groove of the tubular pole 13. This position is obtained as a result of the movement of the 70 and of the shaft annular end piece 73 up to the moment when the latter is in contact with the end part of the socket 71. The orientation of the ring 63 is thus obtained by means of the pegs 69 and the actuating arm 68.

To unlock the pole, the end piece 73 and the shaft 70 are pulled outwards and the ring 63 driven by the arm 68 is put into such a position that the four receptacles 67 face the orifices 64. The balls 65 can then be pushed back into the receptacle 67, with the result that axial movement of the pole 13 is possible.

The ring 63 is returned to its locking position by means of the spring 76, as soon as the end piece 73 of the shaft 70 is released.

The mounting of the pole 13 in the pole support 61 can therefore be obtained by unlocking the device 60 as a result of a pull on the end piece 73, in such a way that the pole 13 can be introduced into the support 61 by axial movement. When the pole 13 is in place in its support, it is locked by releasing the end piece 73.

Reference will now be made to FIGS. 3A and 3B and to FIGS. 8 and 9 to describe the tubular pole 13.

The base 13a of the pole which is fastened in the pole support 61, as described above, has, on its outer surface, a groove containing a gasket 75 and, along its inner bore, a threaded part 87'.

This base 13a is fixed to a tubular assembly 13b of great length which extends the base in its axial direction 8 and to which the electrode-holder 14 is fastened at its end opposite the base 13a.

Figure 8:
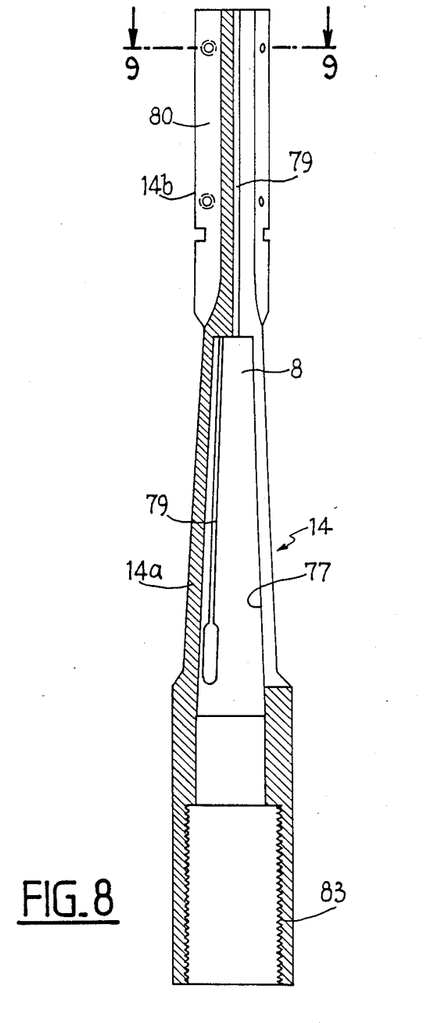
FIG. 8 is a sectional view on a larger scale of the electrode-holder shown in FIG. 3B.
Figure 9:
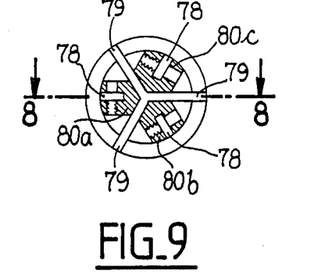
FIG. 9 is a sectional view along line 9—9 of FIG. 8.

As can be seen in FIGS. 3B, 8 and 9, the electrode-holder 14 comprises a tubular part 14a, the bore 77 of which is of frusto-conical shape, and, in the extension of the tubular part 14a, a support 14b to which the electrodes 78 are fastened. Three slits 79 at 120° separate the support 14b into three parts 80a, 80b and 80c, each carrying a tungsten electrode 78 which is mounted removably on the corresponding part of the support and which is fastened by means of a screw.

The slits 79 are extended in the tubular part 14a and pass through the wall of the latter.

An actuating rod 82 is arranged in the axial direction 8 of the tubular pole 13 substantially over its entire length. The electrode-holder 14 has, at the end of its tubular part 14a, a threaded bore 83, in which is fastened the end part 84 of the tubular assembly 13b of the pole forming a sliding and guide bearing for the actuating rod 82. A gasket 85 makes it possible to isolate the interior of the tubular pole from the electrode-holder.

The actuating rod 82, at its end, has a knob 86 of substantially spherical shape, the diameter of which is greater than the diameter of the frusto-conical bore 77 in its running part having the slits 79.

It is clear that the axial movement of the rod 82 in the direction 8 inside the tubular pole makes it possible to spread apart the sectors of the tubular part 14a of the pole separated by means of the slits 79, and therefore of the corresponding parts 80a, 80b and 80c of the support 14b. Thus, the electrodes 78 can be moved radially inside the liner 3 and the tube 1 when the pole is introduced into the liner.

The downward movement of the actuating rod 82 allows the elastic return of the parts 80a, 80b and 80c of the support in the direction of the axis 8.

Referring to FIG. 3A, the means ensuring the axial movement of the rod 82 within the tubular pole 13 will now be described. The rod 82, in its part coming to rest inside the base 13a of the pole, is fixed to an externally threaded bush 87. The bush 87 is engaged with the thread 87' of the base 13a. The end part of the rod 82 passes through a smooth sealing bearing 88 closing the bore of the base 13a. The corresponding end of the rod 82 is fixed to an endpiece ensuring that the rod 82 is guided and driven.

A rod 90 parallel to the rod 82 is likewise fastened to the endpiece 89 and passes through the bearing 88. This rod carries a grasping ring 91 at its end located outside the base 13a. It forms a pin for immobilizing the endpiece 89 in terms of rotation during the movements of the machine.

A pinion 92 is mounted rotatably about the axis 8 on the movable assembly by means of smooth bearings 93 and 94 arranged respectively on the plate 34 and on the plate 35 of the movable assembly 12. A geared motor 95 is fastened to the upper face of the plate 34 and makes it possible to drive the pinion 92 in rotation about the axis 8 by means of pinions 96 and 97. The pinion 92 is fixed to two columns 98 engaged slidably in orifices in the endpiece 89. The pinion 92 is therefore fixed in terms of rotation to the endpiece 89, the rods 82 and 90 and the bearing 88. Rotating the rod 82 fixed to the threaded bush 87 about the axis 8 causes the axial movement of the rod 82 and of the endpiece 89 guided by the columns 98, as a result of interaction between the threaded bush 87 and the internally threaded bore 87'.

The maximum amount of axial movement of the rod 82 determined as a result of the abutment of the piece 89 is 20 mm.

This stroke of 20 mm of the rod 82 allows the knob 86 to move in the frusto-conical bore 77, making it possible for the electrodes 78 to spread apart radially sufficiently to ensure piercing of the liner 3 and the tube 1 by electroerosion.

Figure 5:
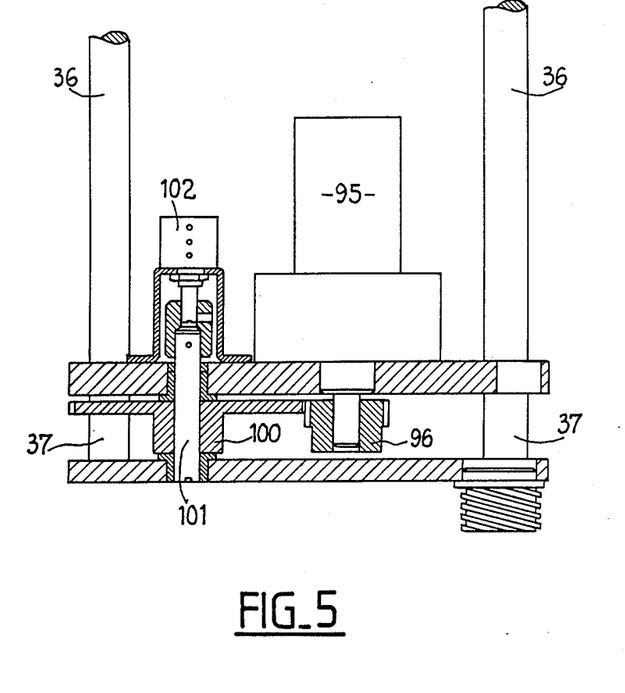
FIG. 5 is a sectional view along line 5—5 of FIG. 4.

As can be seen in FIG. 5, the pinion 96 mounted on the output shaft of the geared motor 95 meshes with a gear wheel 100, the axle 101 of which is mounted rotatably in the plates 34 and 35 of the movable support 12 by means of smooth bearings. The end of the axle 101 is fixed to the rotating part of a potentiometer 102, making it possible to calibrate and measure the movements of the rod 82 and therefore the radial movements of the electrodes 78.

The use of the device for carrying out the cutting of a steam-generator tube 1 and of a repair liner 3 of this tube in the crimping zone A of the liner outside the tube plate 2 will now be described with reference to all the drawing figures and particularly to FIGS. 1, 2 and 7.

Figure 7:
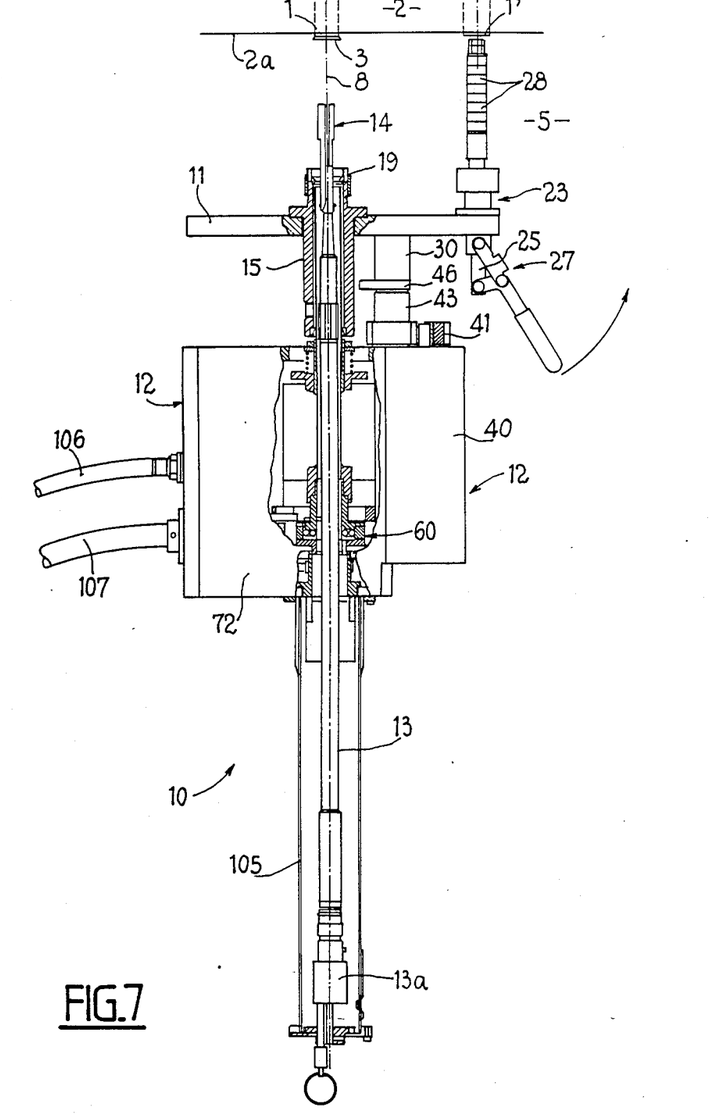
FIG. 7 is a diagrammatic view in elevation and in partial section of the cutting device according to the invention, before it is introduced into the tube plate of the steam generator.

FIG. 7 shows the device 10 according to the invention in the position which it assumes inside the water box 5, before it is fastened to the tube plate 2 and before the introduction of the pole 13 in the axis 8 of a tube 1 containing a repair liner 3 which is to be removed.

The pole 13 of the device is in the retracted position, only the electrode-holder 14 projecting above the sleeve 15 fixed to the support plate 11 of the device. The pole 13 is engaged in the movable assembly 12 which is itself in the high position on its guide and movement elements fixed to the support plate 11.

The pole is engaged, underneath the housing 72 of the movable assembly 12, in a tubular protective housing 105 fixed to the housing 72.

The toggle-type devices 27 of the three fastening means 23 are in their released position, the rings 28 being in a non-expanded state. The nominal outside diameter of these rings 28 is then slightly less than the inside diameter of any tube 1' of the steam generator not having a repair liner 3.

The tool 10 is brought, either automatically with remote control or manually, into its position shown in FIG. 7, where the axis 8 of the pole 13 coincides with the axis of the tube 1 having the liner 3 to be cut. Simultaneously, the axes of the actuating rods and the fastening means 23 are aligned with three tubes 1' near the tube 1.

The end parts of the fastening means 23 having the rings 28 in the non-expanded state are introduced into the tubes 1', and then the toggle-type devices 27 are each actuated in order to lower the corresponding rod 26 and lock it in its low position. This movement of the rod 26 causes the expansion of the rings 28 within the tubes 1'.

The device is put in position in such a way that the gasket 19 comes up against the inlet face 2a of the tube plate. Only the upper part of the pole 13 formed by the electrode-holder 14 is then engaged inside the liner 3.

The pole is introduced through a cut-out in the protective housing 105 provided for this purpose by being pushed manually upwards and is put in position inside the movable assembly 12. To this end, the fastening device 60 is actuated in the opening direction.

When the pole 13 has reached its operating position inside the movable assembly 12, it is locked by means of the device 60, as explained above.

The length of the pole is so selected that, in this position, the electrodes 78 of the electrode-holder 14 are at a level in the tube 1 located slightly above the zone of the liner 3 crimped inside the tube 1 and located outside the tube plate 2.

Axially directed slits can then be cut completely automatically in the liner and the tube by control from outside the water box 5, after the safety pin 90 has been removed.

A cable 106 for supplying electrical current to the pole and to the electrode-holder is fastened to the housing 72 of the movable assembly. The cable 106 passes through a manhole in the water box 5 and is connected to an electrical supply cabinet outside the water box.

Other cables or conduits 107 likewise connected to the housing 72 make it possible, for example, to feed the vibrator 16 which is of the electromagnetic type and which has a restoring spring 108.

The piercing and cutting of the liner 3 and the tube 1 by electroerosion are carried out under water. A circulation of water inside the tube 1 makes it possible to eliminate the metal particles torn off as a result of electroerosion.

Before the device 10 is introduced into the water box 5, the potentiometer 102 making it possible to measure and adjust the movement of the actuating rod 82 and consequently the radial movement of the electrodes 78 has been calibrated.

For that purpose, the electrode-holder 14 is introduced successively into two templates consisting of tubes the inside diameter of which corresponds respectively to the inside diameter of the liner in the crimped zone and to the outside diameter of the tube likewise in the crimped zone A.

Between the two measuring points of the potentiometer, the movement of the actuating rod 82 and therefore of the electrode 78 corresponds to the pasage through the wall of the liner 3 and of the tube 1 in the zone where the cuts are made.

When the device 10 is in position in the tube 1, as mentioned above, the radial movement of the electrodes 78 is therefore effected, by activating the geared motor 95, up to the first measuring point of the potentiometer 102. The electrodes 78 are then virtually in contact with the inner surface of the repair liner 3.

The electrodes 78 are then supplied with electrical current, and at the same time the rod 82 is moved by means of the geared motor 95 up to the second measuring point of the potentiometer 102. When this second measuring point is reached, the complete piercing of the liner 3 and of the tube 1 is carried out over three zones arranged at 120° and corresponding to the position of the electrodes 78. The rod 82 is kept in its high position.

The vibrator 16 and the motor 40 driving the movable assembly 12 in a vertical translation movement are then put into operation.

The vibrator 16 causes an alternating movement of very low amplitude of the pole 13, the electrode-holder 14 and the electrodes 78 in the vertical direction. The downward movement of the movable assembly 12 by means of the motor 40, the nut 43 and the screw 31 simultaneously causes an advancing movement of the electrode-holder in the axial direction. Thus, three slits are cut auto-matically and simultaneously at 120° in the wall of the repair liner 3 and of the tube 1. The movement of the movable assembly 12 ceases when the stop screw 56 has actuated the stop contactor 53 (FIG. 6).

The total amount of movement is of the order of 120 mm, thus making is possible to ensure that the liner and the tube are cut are the entire crimped zone A and over adjacent zones.

The tool 10 can then be removed.

A heating means is introduced into the liner 3 and into the tube 1 in the part located inside the tube plate 2, in order to carry out the contraction and decrimping of the tube and liner after the tube 1 has been cut above the liner 3.

By exerting a pull on the end of the liner and of the tube from the water box 5, the tube 1 and the liner 3 can then be extracted, and the zone A where the three axially directed cuts were made can experience diametral contraction allowing it to pass through the orifice in the tube plate.

In summary, that the device according to the invention makes it possible for three axially directed cuts to be made automatically in a tubular piece from inside thereof. The cuts are made simultaneously as a result of a solely axial movement of the tool, after a first phase when the piercing of the tubular piece consisting of the liner and tube has been carried out.

The mechanical construction of the inventive device is much simpler than a "sawing arc" device which is very difficult to miniaturize for use for the internal cutting of tubes or tubular pieces of a diameter less than 20 mm.

On the other hand, the movements of the electrodes in the course of machining, both in the radial direction during the first piercing phase and in the axial direction during the second cutting phase, are absolutely specific and controlled perfectly.

The axial movements of the movable assembly and the radial movements of the electrodes can take place in a different way from that described.

Likewise, the locking of the tubular pole within the movable assembly can be carried out differently.

It is possible to have other forms for the support of the tool and for the means of fastening it under the tube plate of the steam generator.

Finally, the device according to the invention can be used to make axial slits by cutting in the wall of tubular pieces other than steam-generator tubes and their repair liners.

We claim:

1. Device for cutting by electrical discharge machining the wall of a tubular piece crimped inside a cylindrical receptacle in a fixed installation, in order to make, from the inside of the tubular piece, at least two cuts directed axially relative to the cylindrical receptacle and to the tubular piece, comprising at least one electrode, means for supplying said electrode with electrical current, and means for circulating water in the tubular piece, and further comprising:
(a) a support provided with means for fastening to the fixed installation adjacent the cylindrical receptacle and with guide means in a direction corresponding to an axial direction of the cylindrical receptacle upon fastening of the support;
(b) an assembly mounted movably relative to the support in said axial direction as a result of the guide means and comprising drive means for movement in said axial direction;
(c) a tubular pole mounted on the assembly, having a longitudinal part a diameter of which is less than an inside diameter of the tubular piece;
(d) an electrode-holder fastened to the free end of the longitudinal part of the pole and taking the form of a tubular piece part of whose bore is of frusto-conical shape, separated into at least two segments, each carrying an electrode, by means of axial cuts;
(e) an actuating rod mounted so as to be axially movable in the tubular pole and associated with means for axial movement and of which the end penetrating into the frusto-conical bore has a diameter greater than the diameter of the bore and allows radial movement of the electrodes; and
(f) a device for causing axial vibration, said device having a part movable in the axial direction and fixed to the tubular pole and a fixed part mounted on the movable assembly.

2. Cutting device according to claim 1, wherein the tubular piece consists of a steam-generator tube fixed in a tube plate having an inlet face with which the tube is flush, and wherein the support consists of a plate, the fastening means being adapted to ensure that said plate is fastened in a position parallel to the inlet face of the tube plate.

3. Cutting device according to claim 2, wherein the means for fastening the plate parallel to the face of the tube plate consist of radially expandable rings whose nominal outside diameter is less than the inside diameter of the tubes of the steam generator, and of means for ensuring radial expansion of the rings inside a tube of the steam generator.

4. Cutting device according to claim 3, wherein the means for the radial expansion of the rings consist of a rod and a toggle-type device making it possible to move the rod in its axial direction, the rings being inserted between a bearing means fixed to the rod and a column bearing on the support plate.

5. Cutting device according to claim 2, wherein the means for guiding the movable assembly relative to the support plate consist of columns fastened at one of their ends to the support plate perpendicularly to said support plate, the movable assembly having ball bushes associated with each of the columns.

6. Cutting device according to claim 2, wherein the means for the movement of the movable assembly consist of a screw fixed to the support plate by means of one of its ends and perpendicular to said support plate, of a nut engaged on the screw and mounted rotatably on the movable assembly, and of means for driving the nut in rotation, consisting of a motor and at least one pinion which are carried by the movable assembly.

7. Cutting device according to claim 6, comprising two contactors fixed to the support plate and stops fixed to the movable assembly, in order to stop the motor in either direction of movement in the direction perpendicular to the support plate.

8. Cutting device according to claim 2, wherein the movably assembly comprises at least two parallel plates joined to one another by means of columns perpendicular to the plates, the means for guiding the movable assembly relative to the support plate ensuring a movement of the movable assembly in the direction perpendicular to the support plate and to the plates parallel to the support plate.

9. Cutting device according to claim 2, wherein the pole has a base at one of its ends, and the movable assembly comprises a device for the axial locking and unlocking of the base in the movable assembly.

10. Cutting device according to claim 9, wherein the device for locking and unlocking the pole consists of a tubular pole support which is fixed rigidly to the movable part of the vibrator and the wall of which has radially directed orifices each containing at least one ball, of an outer ring having receptacles on its inner surface and mounted rotatably about the tubular pole support, and of actuation means rotating the outer ring in either direction about the axis of the tubular support, the base of the pole having an axial locking groove which, when the pole is engaged in the pole support, is capable of coming into a position opposite the orifices containing the balls, and the rotation of the outer ring selectively bringing into position opposite the orifices containing the balls a receptacle to ensure the unlocking of the pole and an intermediate part of the inner surface of the ring to ensure the axial locking of the pole as a result of the introduction of the balls into the groove of the base.

11. Cutting device according to claim 9, wherein the base of the tubular pole has an internally threaded bore, and the actuating rod arranged axially in this bore has a threaded part engaged with the internally threaded bore, the actuating rod being associated with means for rotating it about its axis, and the threaded part coaxial relative to the actuating rod ensuring the axial movement of the actuating rod and the radial movement of the electrodes as a result of interaction with the internally threaded bore.

12. Cutting device according to claim 11, wherein the means for driving the rod in rotation consist of a geared motor, at least one pinion driven in rotation by the geared motor, and two guide columns which are fixed to a pinion driven by the geared motor and which are engaged slidably in an endpiece fixed to the end of the actuating rod opposite its end penetrating into the frusto-conical bore of the electrode-holder.

13. Cutting device according to claim 12, comprising a means for measuring the movement of the actuating rod consisting of a potentiometer, the rotary part of which is connected, for driving it in rotation, to the output shaft of the geared motor by means of at least one pinion.

* * * * *